US008619144B1

(12) United States Patent
Chang et al.

(10) Patent No.: US 8,619,144 B1
(45) Date of Patent: Dec. 31, 2013

(54) AUTOMATIC CAMERA CALIBRATION

(75) Inventors: Samuel Henry Chang, San Jose, CA (US); Manika Puri, Santa Clara, CA (US); Edward Dietz Crump, Santa Cruz, CA (US); Steve G. Gonzalez, Davenport, CA (US)

(73) Assignee: Rawles LLC, Wilmington, DE (US)

( * ) Notice: Subject to any disclaimer, the term of this patent is extended or adjusted under 35 U.S.C. 154(b) by 0 days.

(21) Appl. No.: 13/419,857

(22) Filed: Mar. 14, 2012

(51) Int. Cl.
*H04N 17/00* (2006.01)
(52) U.S. Cl.
USPC .......................................... 348/187; 348/180
(58) Field of Classification Search
USPC .................... 348/722, 187, 188, 180
IPC .................. H04N 17/00,17/02, 5/222
See application file for complete search history.

(56) References Cited

U.S. PATENT DOCUMENTS

| 4,485,409 A * | 11/1984 | Schumacher | 348/552 |
| 2006/0152589 A1* | 7/2006 | Morrison et al. | 348/208.1 |
| 2013/0083168 A1* | 4/2013 | Kim et al. | 348/187 |

* cited by examiner

*Primary Examiner* — Sherrie Hsia
(74) *Attorney, Agent, or Firm* — Lee & Hayes, PLLC

(57) ABSTRACT

Devices and techniques are described for automatically calibrating a camera system. The camera system undergoing calibration is coupled to a computing device and an automated positioning platform coupled to a target structure. The computing device acquires images from the camera of the target structure in a plurality of repeatable poses. From these acquired images, intrinsic camera parameters may be determined. Once determined, the parameters may be used to correct images acquired by the camera system.

20 Claims, 6 Drawing Sheets

AUTOMATIC CAMERA CALIBRATION

BACKGROUND

Cameras are used for a variety of applications, including human-machine interfaces, augmented reality environments, gaming, metrology, and so forth. These applications typically benefit from calibrating the corresponding cameras prior to using these cameras to acquire images.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
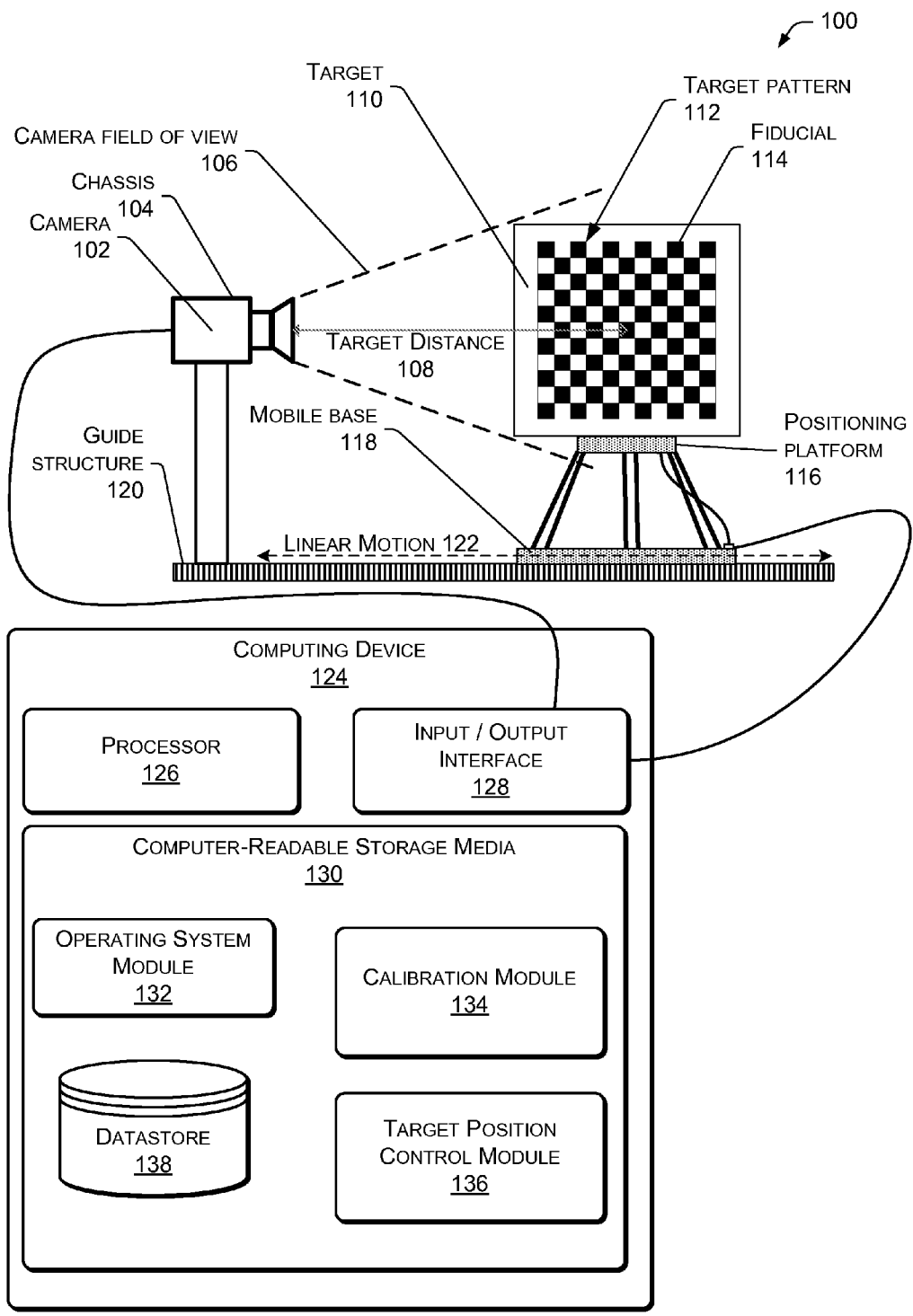
FIG. 1 shows an illustrative automated camera calibration system.

Images acquired by cameras are used in a variety of settings. In some settings, such as machine vision to support an augmented reality environment, camera calibration may prove useful. For example, in an augmented reality environment, the calibrated camera may be used to generate calibrated images which are highly precise and which, when processed, result in highly accurate data about the environment.

Camera calibration allows for determination of calibration data such as intrinsic camera parameters and extrinsic camera parameters. The intrinsic camera parameters include, but are not limited to, focal point, principal point, skew coefficients, and so forth. The extrinsic camera parameters include, but are not limited to, target distance, relative angles between the camera and the target, and so forth. Once the parameters are determined, adjustments or compensation may be made to account for them, improving overall accuracy of acquired images.

Disclosed herein are systems and techniques for automatically calibrating a camera system. These systems and techniques allow calibration that is free from human intervention, minimizes or eliminates potential for human error, reduces calibration time, improves calibration accuracy, and so forth.

The camera under calibration is configured to image a target with varying distances, orientations, or both relative to the camera. A particular combination of distance and orientation is termed a "pose." A computing device acquires images from the camera and sets the target using a computer-controlled mechanism to varying poses without user intervention while acquiring calibration images. These varying poses are repeatable in that substantially the same pose may be generated again upon command.

An observed location of the target and particular points, such as fiduciary markers (or "fiducials"), is obtained from the acquired images. These fiducials may form a pattern, such as a checkerboard. Features of the fiducials such as corners, edges, and so forth may be extracted. Based on prior knowledge of the fiducials their spatial arrangement, and at least a portion of the extracted features, one or more calculated locations may be generated. For example, corners of the checkerboard may be recognized. From these corners and a count of the number of squares in the checkerboard, calculated locations of intersections between squares may be determined.

Intrinsic and extrinsic camera parameters may then be generated based on comparison of the observed locations with the calculated locations. The calculated locations are outputs of a function of these parameters. The intrinsic camera parameters may include a focal point, principal point, skew coefficient(s), distortion coefficient(s), and so forth. Extrinsic camera parameters may include target distance, relative angles between the camera and the target, and so forth.

Using the outputs of the function of the intrinsic and extrinsic parameters, a reprojection error may be calculated. The reprojection error expresses the variance between the observed location and the calculated location. For example, for a given corner of the checkerboard in the camera image, a corresponding three-dimensional (3D) location of the corner may be calculated using estimated parameters. The estimated 3D location is then compared with the 3D position of the corresponding physical checkerboard corner. Then a reprojection error may be defined, such as the observed location is +0.5 pixels along an x-axis and −0.3 pixels along a y-axis of the checkerboard.

By utilizing the repeatability of the computer-controlled mechanism, images from repeatable poses may be acquired for use in multiple iterations. By iterating the calibration process, accuracy may be improved such the reprojection error in some implementations may attain sub-pixel accuracy. Said another way, by iterating the calibration may be refined such that the observed location and the calculated locations converge.

In some implementations, the distance between the camera and the target may be varied under computer control. This variation in distance may maintain the target in a full field-of-view of the camera, maintain the target or a portion thereof in focus, and so forth.

The intrinsic camera parameter data may be stored and used to calibrate the camera, improving the accuracy of images acquired by the camera using image distortion correction. Images acquired by the calibrated camera may thus be used for high-precision applications such as imaging objects in an augmented reality environment, remote sensing, metrology, quality assurance, and so forth.

Illustrative Environment

FIG. 1 shows an illustrative automated camera calibration system 100 in which a camera 102 is undergoing calibration. The camera 102 is configured to generate images from visible light, non-visible light, or both. For example, in one implementation the camera 102 may be configured to generate a thermal image as well as a visible light image. The camera 102 comprises an imaging element such a charge-coupled device (CCD), complementary metal-oxide semiconductor (CMOS), microbolometer array, and so forth. The camera 102 also comprises one or more optical elements such as lenses, prisms, mirrors, and so forth. The camera 102 may be housed within a chassis 104.

The camera 102 has a camera field of view 106 which describes a particular solid angle originating at a particular point-of-view. The camera field of view 106 may vary according to changes in the configuration of the camera 102. For example, an optical zoom of the camera may narrow the camera field of view 106.

A target distance 108 separates the camera 102 from a camera target 110, or simply a "target" 110 hereinafter. The target distance 108 may be measured between a designated point relative to the camera 102 and a designated point relative to the target 110. For example, from a front edge of the chassis 104 to the center of the target 110.

The target 110 comprises a substrate and one or more structural elements configured to present a target pattern 112 in a repeatable fashion after one or more physical translations, rotations, or combinations thereof. In some implementations the target 110 may comprise glass, metal, plastic, paper, and so forth. Furthermore, the target 110 may be placed at a distance 108 such that the entire target pattern 112 is within the camera field of view 116.

The target pattern 112 is configured to be visualized by the camera 102. For example, where the camera 102 operates in infrared wavelengths, the target pattern 112 is configured to provide an image in those infrared wavelengths. The target pattern 112 comprises one or more features arranged in a known configuration. For example, a checkerboard target pattern 112 comprising alternating white and dark squares is shown here. The squares may be of one or more sizes including but not limited to 20, 30 or 50 millimeters on each side. The target pattern 112 may include different size squares. For example, one section of the target pattern 112 may comprise 20 mm squares while a second section comprises 30 mm squares.

In other implementations, other patterns may be used. These patterns may be produced using a photolithographic process. The target pattern 112 comprises one or more fiduciary markings or fiducials 114. These fiducials 114 provide reference points in the target pattern 112. The target pattern 112 may be planar or comprise non-planar surface features.

The target 110 is coupled to a positioning platform 116. This positioning platform 116 is configured to move in one or more degrees of freedom relative to the camera 102. These degrees of freedom may include but are not limited to roll, pitch, yaw, heave, sway, surge, or a combination thereof to the target 110. For example, as shown here the positioning platform 116 may comprise a Stewart platform, also known as a synergistic motion platform, comprising a plurality of actuators which when activated move the target 110 into a new pose. The positioning platform 116 may comprise one or more linear actuators, rotary actuators, motors, electroactive polymers, piezoelectric actuators, and so forth.

The positioning platform 116 is further configured to move in a linear motion 118 along a guide structure 120. This may be linear motion 118 along one or more axes. The guide structure 120 provides a substantially rigid reference frame between the camera 102 and the positioning platform 116. The guide structure 120 may comprise metal, ceramics, plastics, or a combination thereof.

The linear motion 118 between the target 110 and the camera 102 allows for changes in pose during the calibration process. For example, the positioning platform 116 may be configured to move the target 110 towards or away or left or right relative to the camera 102 by actuating one or more motors.

While the target 110 is shown moving relative to the camera 102, in some implementations the target 110 may remain stationary while the camera 102 is displaced. In another implementation both the camera 102 and the target 110 may be configured to move. For example, the camera 102 may be configured to pan left and right while the target 110 is configured to tilt up and down. By combining these relative motions, various combinations of relative angles between the camera 102 and the target 110 may be produced.

An illuminator 122 may be used to provide known or controlled illumination of the target 110 during acquisition of images by the camera 102. The illuminator 122 may comprise an incandescent, fluorescent, or solid-state device configured to provide illumination compatible with the target pattern 112 and the camera 102. The illuminator 122 may be configured to provide one or more illumination levels to the target 110. In some implementations the illuminator 122 may be calibrated to provide an illumination on the target 110.

A computing device 124 comprising a processor 126, an input/output interface 128, and computer-readable storage media (CRSM) 130 is shown. The processor 126 may comprise one or more processors configured to execute instructions. The instructions may be stored in the CRSM 130, or in other CRSM or memory accessible to the processor 126.

The input/output interface 128 may be configured to couple the computing device 124 to other components within the environment 100 including the camera 102, the positioning platform 116, the illuminator 122, user interface devices, and so forth. The input/output interface 128 may be configured to couple to other devices outside the environment, such as cloud servers via a network interface.

The CRSM 110 may be any available physical media accessible by a computing device to implement the instructions stored thereon or store data within. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device.

Several modules such as instructions, datastores, and so forth may be stored within the CRSM 110 and configured to execute on a processor, such as the processor 126. Modules may also be stored in storage devices accessible on a local network, cloud storage accessible via a wide area network, or distributed across a combination thereof. An operating system module 132 is configured to manage hardware and services within and coupled to the computing device 124 for the benefit of other modules.

A calibration module 134 is configured to generate calibration data for the camera 102. This calibration data may include intrinsic camera parameters as well as extrinsic camera parameters. This calibration data is based at least in part on images of the target pattern 112 as acquired from the camera 102 of the target 110 in different poses. The different poses result from control of the positioning platform 116 by a target position control module 136.

The target position control module 136 is configured to direct actuators coupled to the positioning platform 116 in order to move the target 110 to a pre-determined pose. The actuators may be configured to provide positioning feedback, allowing for precision determination of the relative position of the physical structures. For example, one or more linear actuators of the positioning platform 116 may be configured with linear encoders allowing for feedback as to actual displacement of the actuator after a command to displace the actuator from the target position control module 136 has been performed.

Data associated with operation of the computing device 124 may be stored within a datastore 138. The datastore 138 may be stored on one or more of the CRSM 130, storage devices accessible on the local network, cloud storage accessible via a wide area network, or distributed across one or more of these. For example, the calibration results for the camera 102 such as extrinsic camera parameters may be stored within the datastore 138.

Figure 2:
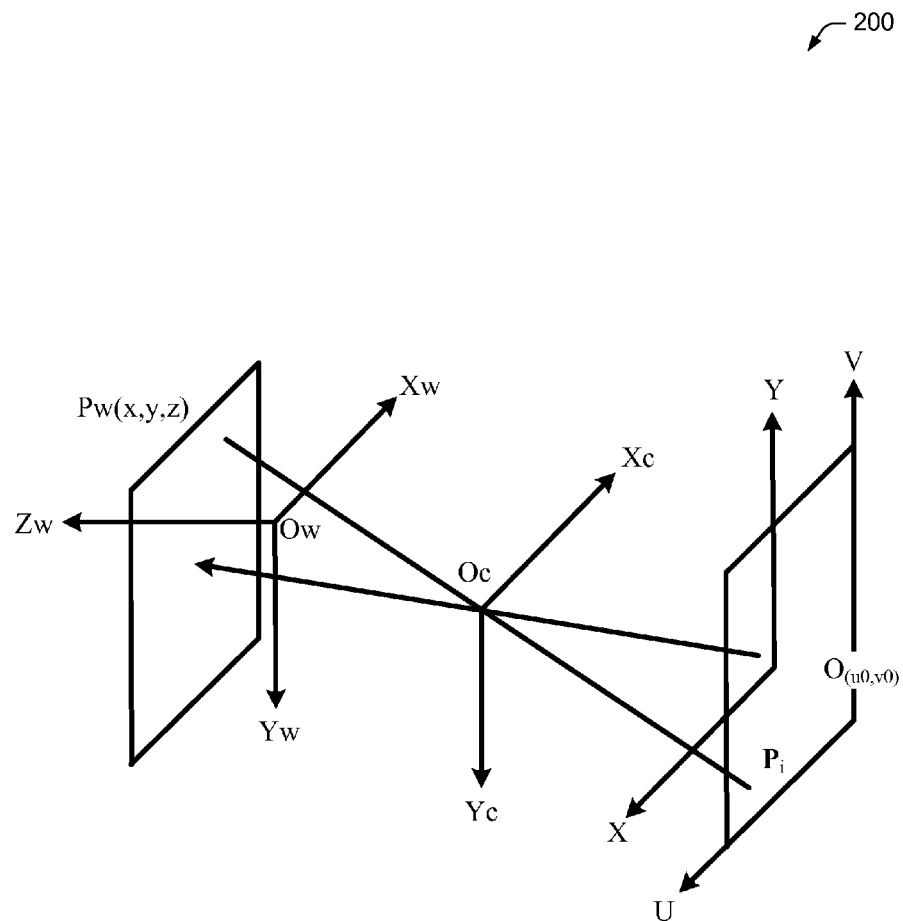
FIG. 2 illustrates camera-related coordinate relationships.

FIG. 2 illustrates camera-related coordinate relationships 200 as discussed herein. In this illustration, Pw (x,y,z) represents the coordinate of a measured point with respect to the world coordinate in object space, Pc(xc, yc, zc) represents the corresponding coordinate of P in camera coordinate system, and Pi(u,v) represents the image point P with respect to an image coordinate O.

The camera 102 has intrinsic parameters and extrinsic parameters. The intrinsic parameters are those internal to the optical system of the camera 102. The extrinsic parameters are those which relate to factors external to the camera 102 optical system, such as overall direction of the camera relative to a reference point in the environment. Individual intrinsic camera parameters are discussed in more detail below with regards to FIG. 3 while extrinsic camera parameters are discussed in more detail below with regards to FIG. 4.

The intrinsic and extrinsic parameters and their relations are shown as follows:

$$z_c \begin{bmatrix} u \\ v \\ 1 \end{bmatrix} = \begin{bmatrix} a_x & s & u_0 \\ 0 & a_y & v_0 \\ 0 & 0 & 1 \end{bmatrix} * \begin{bmatrix} R & t \\ 0_3^T & 1 \end{bmatrix} * \begin{bmatrix} x_w \\ y_w \\ z_w \\ 1 \end{bmatrix} = \quad \text{(Equation 1)}$$

$$\begin{bmatrix} m_1 & m_2 & m_3 & m_4 \\ m_5 & m_6 & m_7 & m_8 \\ m_9 & m_{10} & m_{11} & m_{12} \end{bmatrix} * \begin{bmatrix} x_w \\ y_w \\ z_w \\ 1 \end{bmatrix}$$

(Equation 1)

Where mi to mu represent twelve unknown camera parameters and $a_x$, $a_y$, s, $u_0$, $v_0$, R, and t are the parameters the calibration system 100 determines As described above, the camera parameters comprise of intrinsic parameters $a_x$, $a_y$, s, $u_0$, $v_0$ and extrinsic parameters R and t. The intrinsic and extrinsic parameters may be solved for once $m_1$ to $m_{11}$ are known.

As used herein, $a_x$ is a ratio of the focal length and the unit pixel dimension with respect to the x-axis. Similarly ay is a ratio with respect to the y-axis, s is the skew, and u0, v0 are the pixel plane center coordinates. R is the rotation metric and t is the translation vector. Herein, $a_x$ is the focal length over the unit pixel dimension with respect to x-axis and $a_y$ with respect to y-axis, s is skew, and $u_0$, $v_0$ are pixel plane center coordinates. R is the rotation metric and t is the translation vector. A projector may be considered the inverse of a camera, therefore the same parameters used for a camera can be considered for projector parameters.

Figure 3:
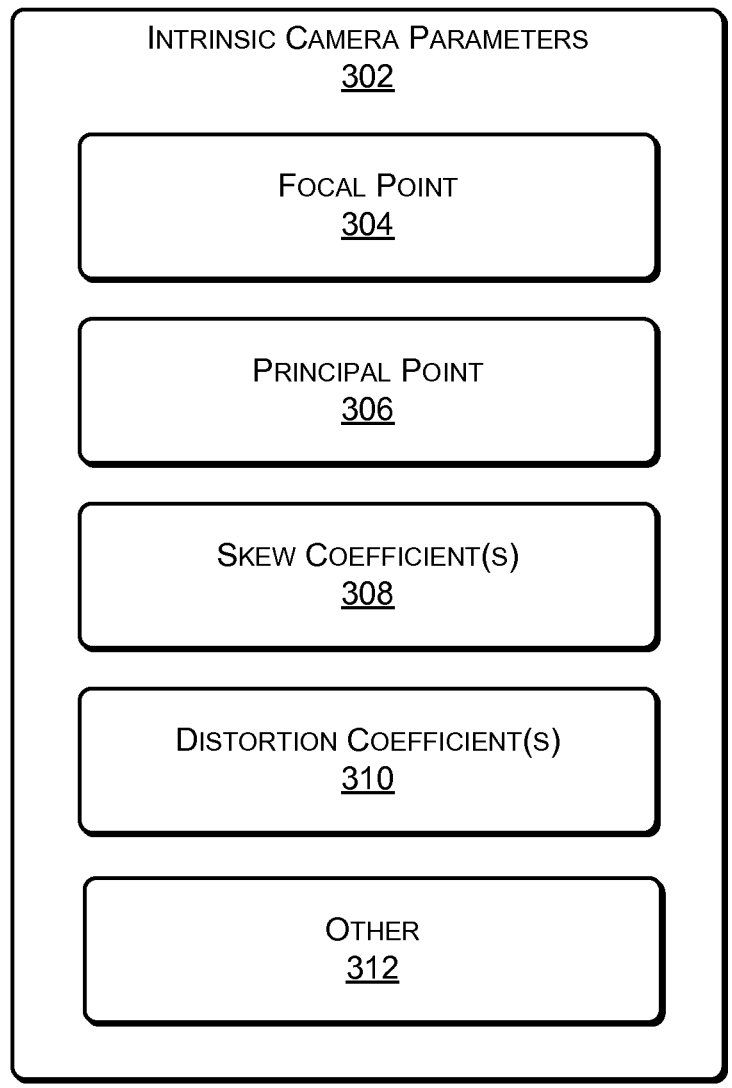
FIG. 3 illustrates intrinsic camera parameters which may be determined by the automated camera calibration system.

FIG. 3 illustrates intrinsic camera parameters 302 which may be determined or altered by the automated camera calibration system 100. A focal point 304 of the system may be determined in some instances. The focal point 304 is a point within relative to optical elements within the camera 102 at which collimated light is parallel to the axis of the optical system. A focal length is a distance from a principal plane of a lens or mirror to the focus.

A principal point 306 may also be determined using the automated camera calibration system 100. The principal point 306 is a point at which a principal plane crosses an optical axis. Other intrinsic camera parameters include one or more skew coefficients 308 and distortion coefficients 310. The skew coefficients 308 define an angle between x and y pixel axes. The distortion coefficients 310 describe radial, tangential, or radial and tangential variations. In other implementations other 312 intrinsic camera parameters may also be determined.

Figure 4:
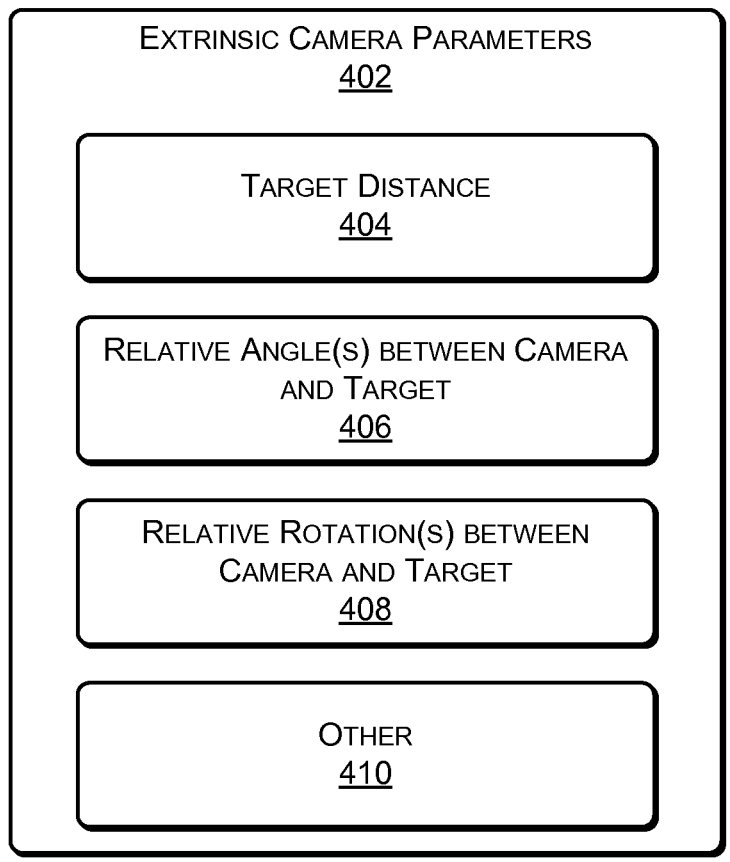
FIG. 4 illustrates extrinsic camera parameters which may be determined by the automated camera calibration system.

FIG. 4 illustrates extrinsic camera parameters 402 which may be determined by the automated camera calibration system 100. The extrinsic camera parameters 404 describe the overall camera system in relation to the outside environment. As shown here, these parameters may include a target distance 404, which is a distance between the camera 102 and the target 110. One or more relative angles between the camera 102 and the target 110 may also be defined. A relative rotation 408 between the camera 102 and the target 110 may be considered as well. In other implementations, other 410 extrinsic camera parameters may be determined.

Figure 5:
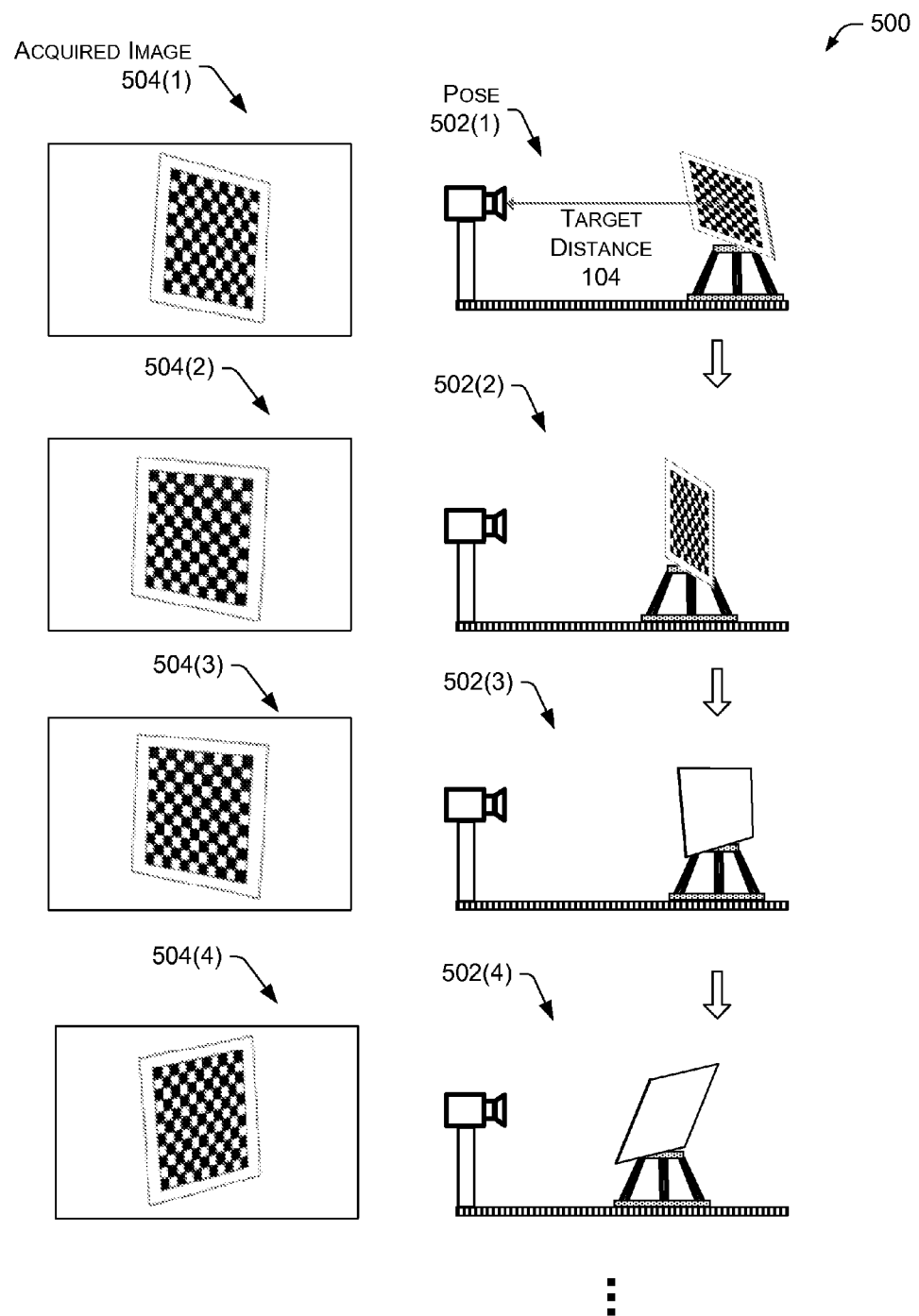
FIG. 5 illustrates a series of acquired images of a calibration target in different poses relative to the camera.

FIG. 5 illustrates a series 500 of acquired images of a calibration target in different poses relative to the camera. A series of poses 502(1)-(4) are shown, as well as corresponding acquired images 504(1)-(4) as received from the camera 102. As the pose 502 changes, the camera 102 acquires one or more images. For example, as shown here, while in the pose 502(1) the camera 102 may acquire a predetermined number of images to form a set of images. This predetermined number may be set to a particular value such as twenty, or may involve a trigger event, such as acquiring images until a particular threshold condition is met. For example, images may be acquired until the target pattern 112 is in focus.

As described below with regards to FIG. 6, an image may be selected from this set which is suitable for further processing. Once that set has been acquired, the positioning platform 116 may then reposition the target 110 to the second pose 502(2), during which another set of images are acquired. By acquiring several images from different poses, in some implementations the system may iteratively refine the camera calibration.

As mentioned above, the positioning platform 116 may impart linear motion 122 which changes the target distance 108. As shown here, at 502(4), the positioning platform 116 has moved closer to the camera 102. Changes in target distance 108 may be used to accommodate changes in zoom by the camera 102. For example, a high zoom factor of the camera 102 may be used with a first target distance 108 such as pose 502(1) while the same camera 102 operating with a low zoom factor may have a second target distance 108 less than the first, such as shown at 502(4).

Based on the pose and the images acquired, the calibration module 134 is configured to generate calibration data for use in calibrating the camera 102. The process of generating the calibration data is described next with regard to FIG. 6.

Illustrative Processes

The processes described in this disclosure may be implemented by the devices described herein, or by other devices. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented on other devices as well.

Figure 6:
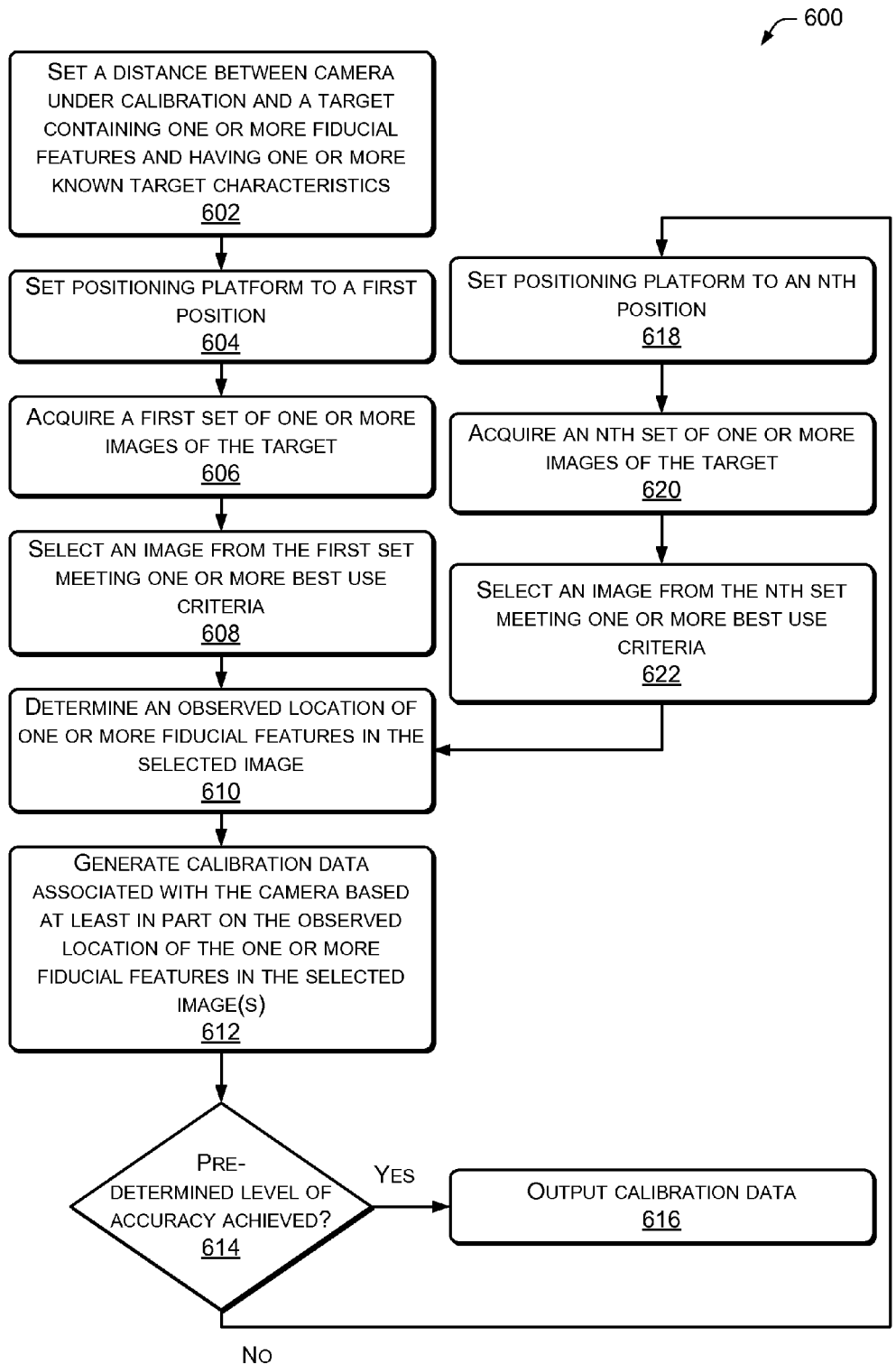
FIG. 6 is a process of determining with an automated system camera calibration data.

FIG. 6 is a process 600 of determining camera calibration data with an automated system. The process 600 may be repeated using distinct poses to gather variation data across these poses. In some implementations poses may be re-used. For example, poses 502(1), 502(2), 502(3), and 502(1) may be used to acquire image data of the target.

At 602, a distance between the camera 102 under calibration and the target 110 containing one or more fiducials 114 is set. For example, the positioning platform 116 may move in a linear motion 118 along the guide structure 120 resulting in displacement of the target 110 relative to the camera 102 such that the target 110 fills the field-of-view of the camera 102. In one implementation, the target 110 may be considered to fill the field of view of the camera 102 when at least one side or edge of the target 110 extends from substantially one edge of the camera's field-of-view to an opposite edge. The one or more fiducials 114 exhibit one or more known target characteristics, such as known number of squares, known dimensions of the squares, and so forth.

At 604, the positioning platform 116 is set to a first position. For example, the positioning platform 116 may orient the target 110 such that it is orthogonal to the camera 102. The target 110 is now in a first pose.

At 606, a first set of one or more images are acquired of the target 110. These acquired images comprise the target pattern 112 and the fiducials 114. In some situations, some of the images in the set may be unsuitable for further use. These may be discarded or non-selected.

At 608, at least one image is selected from the first set which meets one or more best use criteria. These best use criteria may include focus, best fit of lines through the grid pattern, contrast, image noise, clearest image, whether the entire target pattern 112 is present within the acquired image, presence of reflections, and so forth. For example, an image in which the target pattern 112 is out of focus may be discarded or non-selected.

At 610, an observed location of one or more of the fiducial features 114 in the target pattern 112 are determined in the selected image. For example, the corners of the target pattern 112 may be identified, designated, and located within the acquired image which has been selected.

At 612, calibration data associated with the camera is generated based at least in part on the observed location of the one or more fiducial features in the selected image(s).

At 614, a determination is made as to when a pre-determined level of accuracy is achieved. When a pre-determined level of accuracy is achieved, the process proceeds to 616. At 616, calibration data is output. When at 614 the pre-determined level of accuracy is not achieved, the process continues to 618 where additional iterations of poses and images are acquired and used to generate and refine the calibration data.

At 618, the positioning platform is set to an nth position, where "n" is an integer number greater than zero. At 620, an nth set of one or more images of the target are acquired. At 622, an image is selected from the nth set which meets one or more best use criteria, such as described above. The process then returns to 610 to determine an observed location of the one or more fiducial features in the selected image. The process then proceeds on to 612 to generate or refine calibration data based at least in part on the observed location of the one or more fiducial features in the selected image.

The number of poses and corresponding iterations may vary depending upon the number of camera parameters to be determined, level of accuracy to be produced, and so forth. For example, to provide constraints allowing solution of the unknowns in Equation 1, twenty or more different poses and corresponding images may be used.

By using the techniques and systems described herein, the calibration data including intrinsic parameters may be accurately and quickly determined for cameras. This calibration data may be associated with the camera and used for processing images such that resulting images display a very high level of precision and accuracy with regards to the images acquired.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
   a target structure comprising one or more fiducial features;
   an automated positioning platform coupled to the target structure and under control of one or more computing systems, the positioning platform configured to orient the target structure to a plurality of poses by moving in one or more degrees of freedom at least partly in response to receiving corresponding instructions from the one or computing systems;
   a camera configured to acquire one or more acquired images of the target structure in each of the plurality of poses;
   a calibration module configured to:
      determine an observed location of the one or more fiducial features within at least a portion of the one or more acquired images of the target structure in the plurality of poses; and
      generate calibration data associated with the camera based at least in part on the observed location of the one or more fiducial features in the acquired images.

2. The system of claim 1, wherein the one or more fiducial features comprise a checkerboard pattern.

3. The system of claim 2, wherein the checkerboard pattern comprises squares of two or more sizes.

4. The system of claim 1, wherein the positioning platform is configured to vary a linear target distance between the target structure and the camera before acquisition of the image of the target structure and at least partly in response to receiving a corresponding instruction from the one or more computing systems.

5. The system of claim 4, wherein the linear target distance is adjusted such that the target structure substantially fills a field-of-view of the camera.

6. The system of claim 1, wherein the positioning platform comprises a Stewart platform.

7. The system of claim 1, wherein the positioning platform comprises two or more rotary stages coupled to one another.

8. The system of claim 1, the calibration data comprising one or more intrinsic camera parameters of the camera.

9. The system of claim 8, the one or more intrinsic camera parameters comprising a focal point, a principal point, or both a focal point and a principal point.

10. The system of claim 1, the calibration data comprising one or more extrinsic camera parameters of the camera.

11. One or more computer-readable non-transitory storage media storing instructions that, when executed by one or more processors, cause the one or more processors to perform acts comprising:
- setting, to a pose, a positioning platform coupled to a target presenting one or more fiducial features;
- acquiring, with a camera, a set of one or more images of the target while the positioning platform is in the pose;
- selecting an image from the set of one or more images meeting one or more criteria;
- determining an observed location of one or more fiducial features in the selected image; and
- generating calibration data associated with the camera based at least in part on the observed location of the one or more fiducial features.

12. The one or more computer-readable non-transitory storage media of claim 11, further comprising:
- until a pre-determined level of accuracy in the calibration data has been reached:
- setting the positioning platform to an nth pose,
- acquiring, with the camera a second set of one or more images of the target while the positioning platform is in the nth pose;
- selecting a second selected image from the nth set of one or more images meeting one or more criteria;
- determining an observed location of one or more fiducial features in the nth selected image; and
- generating calibration data associated with the camera based at least in part on the observed location of the one or more fiducial features in the nth selected image.

13. The one or more computer-readable non-transitory storage media of claim 11, the determining of the location of the one or more fiducial features in the selected image comprising identifying a plurality of corners of the one or more fiducial features.

14. The one or more computer-readable non-transitory storage media of claim 11, the one or more criteria comprising one or more of:
- fit of lines to a pre-determined value through a pattern on the target,
- an amount of image distortion, or
- an amount of image clarity.

15. The one or more computer-readable storage media of claim 11, further comprising estimating one or more intrinsic camera parameters for the camera based at least in part on the calibration data.

16. One or more computer-readable non-transitory storage media storing instructions that, when executed by one or more processors, cause the one or more processors to perform acts comprising:
- directing a camera target coupled to a positioning platform between a plurality of poses by adjusting the positioning platform in a linear motion;
- acquiring with a camera one or more images of the camera target in the plurality of poses; and
- generating camera calibration data based at least in part on features present in the camera target.

17. The one or more computer-readable non-transitory storage media of claim 16, wherein the plurality of poses further comprise different relative angles between the target and the camera.

18. The one or more computer-readable non-transitory storage media of claim 16, wherein the features comprise one or more fiducial features.

19. The one or more computer-readable non-transitory storage media of claim 16, wherein the generating the camera calibration data comprises determining an observed location of one or more of the features.

20. The one or more computer-readable non-transitory storage media of claim 16, wherein the camera calibration data comprises one or more of the following intrinsic camera parameters:
- a focal point,
- a principal point,
- an optical skew coefficient, or
- an optical distortion coefficient.

* * * * *